United States Patent Office 3,341,578
Patented Sept. 12, 1967

3,341,578
PREPARATION OF SUCCINIC ACID
James F. Vitcha, New Providence, N.J., and Lester Weintraub, Bronx, N.Y., assignors to Air Reduction Company, Incorporated, New York, N.Y., a corporation of New York
No Drawing. Filed Oct. 30, 1963, Ser. No. 319,971
7 Claims. (Cl. 260—537)

This invention is concerned with the synthesis of succinic acid and is more particularly concerned with a method of forming succinic acid in high yield and in a form requiring little or no purification.

Succinic acid is a well-known compound finding wide use in the chemical industry in the manufacture of lacquers, dyes, esters for perfumes, and the like. Succinic acid is commercially produced by the fermentation of ammonium tartrate, or it can be produced synthetically by various methods, such as the hydrogenation of maleic acid of fumaric acid. In these known processes, however, the succinic acid is initially produced in an impure form and extensive, and sometimes very complex, purification procedures must be employed in order to produce a commercially-acceptable product, particularly when a reagent grade succinic acid is desired; e.g., when the succinic acid is to be used as the raw material for the synthesis of derivatives, such as esters.

It is an object of this invention to provide a new method of synthesizing succinic acid.

It is a further object of the invention to provide a method of directly producing succinic acid in pure form.

It is another object of the invention to provide a method of synthesizing succinic acid in high yield and in a form which can be used as a reagent without special purification.

It is a still further object of the invention to provide a process for preparing succinic acid which produces a reaction mixture from which the product succinic acid is readily separated in relatively pure form.

In accordance with the invention, succinic acid is prepared by reacting acrylic acid and carbon monoxide in the presence of oleum, viz "fuming" sulfuric acid, which is a solution of sulfur trioxide in sulfuric acid and is conventionally characterized as $H_2S_2O_7$ or $SO_3(H_2SO_4)$, followed by hydration with $H_2O$, suitably in the form of ice. This reaction may be exemplified by the following equation, the formation of intermediates and intermediate reactions being disregarded:

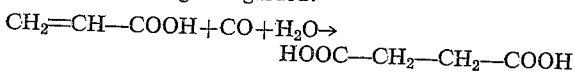

This reaction has been found to proceed smoothly and rapidly in high yield and the product succinic acid is obtained merely by pouring the reaction mixture over ice to precipitate the succinic acid directly, followed by simple washing with water.

The reaction proceeds readily without application of heat, e.g., at room temperature, but slight warming, e.g., to 40–50° C., is beneficial in promoting the speed of the reaction. Additional heat may be applied but there is no particular advantage in doing so. Excessive heat tends to cause polymerization of the acrylic acid, but temperatures up to the boiling point of acrylic acid can be employed if desired.

Carbon monoxide is a gas and it must, therefore, be supplied to the reaction system under pressure, but any convenient pressure may be employed. Particularly good results are obtained with pressures of 1000–1500 p.s.i.g., but pressures below and above this range can be utilized.

The reaction can be carried out in any vessel which is capable of handling a gas under the pressures employed and which is also resistant to attack by the reactants. A stainless steel autoclave is particularly suitable.

Oleum is supplied commercially in various grades which vary with respect to the content of $SO_3$ in the sulfuric acid, e.g., 10%, 20%, 40%, 60%, 66%, and the like. Any of these grades is suitable but preferably the oleum contains at least 20% $SO_3$. It has been found that the presence of the $SO_3$ is essential and when ordinary concentrated sulfuric acid is employed, in place of oleum, no reaction has been found to occur. When, however, oleum is present, there is a quantitative uptake of carbon monoxide. More advantageously, the amount of oleum employed is such that a stoichiometric quantity of $SO_3$ is present with respect to the acrylic acid, and the carbon monoxide is, of course, present in sufficient quantity to provide a stoichiometric amount in relation to the acrylic acid. Excess quantities of $SO_3$ and/or CO can be employed, e.g., 50% excess, but there is no particular advantage in such excess quantities.

The invention will now be illustrated by reference to a specific example of practical application.

Into a stainless steel autoclave there were charged 0.8 mole of acrylic acid and 200 ml. of 20% oleum, and 0.8 mole of carbon monoxide was introduced at a pressure of 1200 p.s.i.g. over a period of 15 hours. The reaction mixture was maintained at 40° by means of a water bath and reaction was continued for one hour after the addition of the stoichiometric quantity of carbon monoxide. At the end of this time, the autoclave was opened and the reaction mixture was poured over ice, and product succinic acid precipitated directly. The succinic acid was collected and washed with 200 ml. of cold water, and was then dried. The product succinic acid was found to be of reagent grade and to have a melting point of 184–185° C., with no depression of the melting point occurring when a sample of the product was mixed with a known sample of reagent-grade succinic acid. The yield of succinic acid based upon acrylic acid charged to the autoclave was 85%.

It will be understood that various changes and modifications can be made without departing from the invention as defined in the appended claims. It is intended, therefore, that all matter contained in the foregoing description shall be interpreted as illustrative only, and not as limitative of the invention.

We claim:
1. A method of making succinic acid which comprises reacting acrylic acid and carbon monoxide at superatmospheric pressure and at a temperature of at most the boiling point of acrylic acid in the presence of oleum, the carbon monoxide being in at least stoichiometric quantity with respect to the acrylic acid, and hydrating the resultant reaction product.

2. A method of making succinic acid which comprises reacting acrylic acid and carbon monoxide at superatmospheric pressure and at a temperature of at most the boiling point of acrylic acid in the presence of oleum, the carbon monoxide being in at least stoichiometric quantity with respect to the acrylic acid, and hydrating the resultant reaction product with ice.

3. A method of making succinic acid which comprises reacting acrylic acid and carbon monoxide at a temperature of 40° to 50° C. and at a pressure of 1000 to 1500 p.s.i.g. in the presence of oleum, the carbon monoxide being in at least stoichiometric quantity with respect to the acrylic acid, and hydrating the resultant reaction product.

4. A method of making succinic acid which comprises reacting acrylic acid and carbon monoxide at a temperature of 40° to 50° C. and at a pressure of 1000 to 1500 p.s.i.g. in the presence of oleum, the carbon monoxide being in at least stoichiometric quantity with respect to the acrylic acid, and hydrating the resultant reaction product with ice.

5. A method of making succinic acid which comprises reacting acrylic acid and carbon monoxide under super-atmospheric pressure and at a temperature of at most the boiling point of acrylic acid in the presence of oleum, the carbon monoxide and the $SO_3$ in the oleum each being in at least about stoichiometric quantity with respect to the acrylic acid, and hydrating the resultant reaction product.

6. A method of making succinic acid which comprises reacting acrylic acid and carbon monoxide at a temperature of 40° to 50° C. and at a pressure of 1000 to 1500 p.s.i.g. in the presence of oleum, the carbon monoxide and the $SO_3$ in the oleum each being in at least about stoichiometric quantity with respect to the acrylic acid, and hydrating the resultant reaction product.

7. A method of making succinic acid which comprises reacting acrylic acid and carbon monoxide at a temperature of 40° to 50° C. and at a pressure of 1000 to 1500 p.s.i.g. in the presence of oleum, the carbon monoxide and the $SO_3$ in the oleum each being in at least about stoichiometric quantity with respect to the acrylic acid, and hydrating the resultant reaction product with ice.

References Cited

UNITED STATES PATENTS

| 2,341,663 | 2/1944 | Schulz | 260—486 |
| 2,457,111 | 12/1948 | Gresham | 260—485 |
| 2,604,490 | 7/1952 | Reppe | 260—533 |

FOREIGN PATENTS

| 1,251,646 | 3/1960 | France. |

LORRAINE A. WEINBERGER, *Primary Examiner.*

LEON ZITVER, *Examiner.*

R. PELLMAN, S. B. WILLIAMS, JR.,
*Assistant Examiners.*